(12) United States Patent
Toyoda et al.

(10) Patent No.: US 12,258,015 B2
(45) Date of Patent: Mar. 25, 2025

(54) DRIVING SUPPORT APPARATUS, DRIVING SUPPORT METHOD, AND NON-TRANSITORY COMPUTER-READABLE STORAGE MEDIUM

(71) Applicant: TOYOTA JIDOSHA KABUSHIKI KAISHA, Toyota (JP)

(72) Inventors: Hiroshi Toyoda, Numazu (JP); Yuta Ikezawa, Susono (JP); Kohei Tochigi, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 211 days.

(21) Appl. No.: 18/098,431

(22) Filed: Jan. 18, 2023

(65) Prior Publication Data
US 2023/0227036 A1 Jul. 20, 2023

(30) Foreign Application Priority Data
Jan. 20, 2022 (JP) ................................. 2022-007351

(51) Int. Cl.
*B60W 30/14* (2006.01)
*B60W 10/18* (2012.01)
*B60W 30/18* (2012.01)
*B60W 50/14* (2020.01)
*B60W 50/16* (2020.01)

(52) U.S. Cl.
CPC .......... *B60W 30/146* (2013.01); *B60W 10/18* (2013.01); *B60W 30/18154* (2013.01);
(Continued)

(58) Field of Classification Search
CPC ......... B60W 30/146; B60W 30/18154; B60W 30/18145; B60W 10/18; B60W 50/16;
(Continued)

(56) References Cited

U.S. PATENT DOCUMENTS

| | | |
|---|---|---|
| 8,355,851 B2 | 1/2013 | Inoue et al. |
| 8,370,040 B2 | 2/2013 | Inoue et al. |

(Continued)

FOREIGN PATENT DOCUMENTS

| | | | |
|---|---|---|---|
| DE | 112014000658 T5 * | 10/2015 | ......... G01C 21/3658 |
| JP | H11-034898 A | 2/1999 | |

(Continued)

*Primary Examiner* — Michael J Zanelli
(74) *Attorney, Agent, or Firm* — Sughrue Mion, PLLC

(57) ABSTRACT

A driving support apparatus includes a surrounding information acquisition device which acquires surrounding information, a steering information acquisition device which acquires steering information, a control unit which executes driving support control including at least one of pre-right/left-turn deceleration assist control or pre-right/left-turn warning control when a predetermined first execution condition is satisfied. When a precondition which is satisfied in a case in which an intersection is detected based on the surrounding information and steering operation is being performed by a driver based on the steering information is satisfied, the control unit determines whether or not the first execution condition is satisfied based on the steering operation being performed and traveling lane arrow information which is road arrow information of a traveling lane or adjacent lane arrow information which is road arrow information of an adjacent lane, both of which being stored in a storage device.

8 Claims, 9 Drawing Sheets

(52) U.S. Cl.
CPC ....... *B60W 50/16* (2013.01); *B60W 2050/143* (2013.01); *B60W 2540/18* (2013.01); *B60W 2552/53* (2020.02); *B60W 2710/18* (2013.01)

(58) Field of Classification Search
CPC ........... B60W 50/14; B60W 2050/143; B60W 2050/146; B60W 2540/18; B60W 2552/53; B60W 2710/18; B60W 40/00; B60W 40/06
See application file for complete search history.

(56) References Cited

U.S. PATENT DOCUMENTS

| | | |
|---|---|---|
| 8,417,430 B2 | 4/2013 | Saeki |
| 8,548,709 B2 | 10/2013 | Morita |
| 8,768,597 B2 | 7/2014 | Kagawa |
| 9,174,643 B2 | 11/2015 | Aso |
| 10,017,178 B2 | 7/2018 | Morimoto et al. |
| 10,118,617 B2 | 11/2018 | Urano et al. |
| 10,486,698 B2 | 11/2019 | Masui et al. |
| 2012/0166072 A1* | 6/2012 | Tamaoki ......... B60W 30/18154 701/300 |
| 2019/0295419 A1 | 9/2019 | Tosa et al. |
| 2020/0001875 A1 | 1/2020 | Kato et al. |
| 2023/0192091 A1* | 6/2023 | Arai ..................... B60W 50/14 701/93 |

FOREIGN PATENT DOCUMENTS

| | | |
|---|---|---|
| JP | 2002-260190 A | 9/2002 |
| JP | 2011-129013 A | 6/2011 |
| JP | 2020-004333 A | 1/2020 |

* cited by examiner

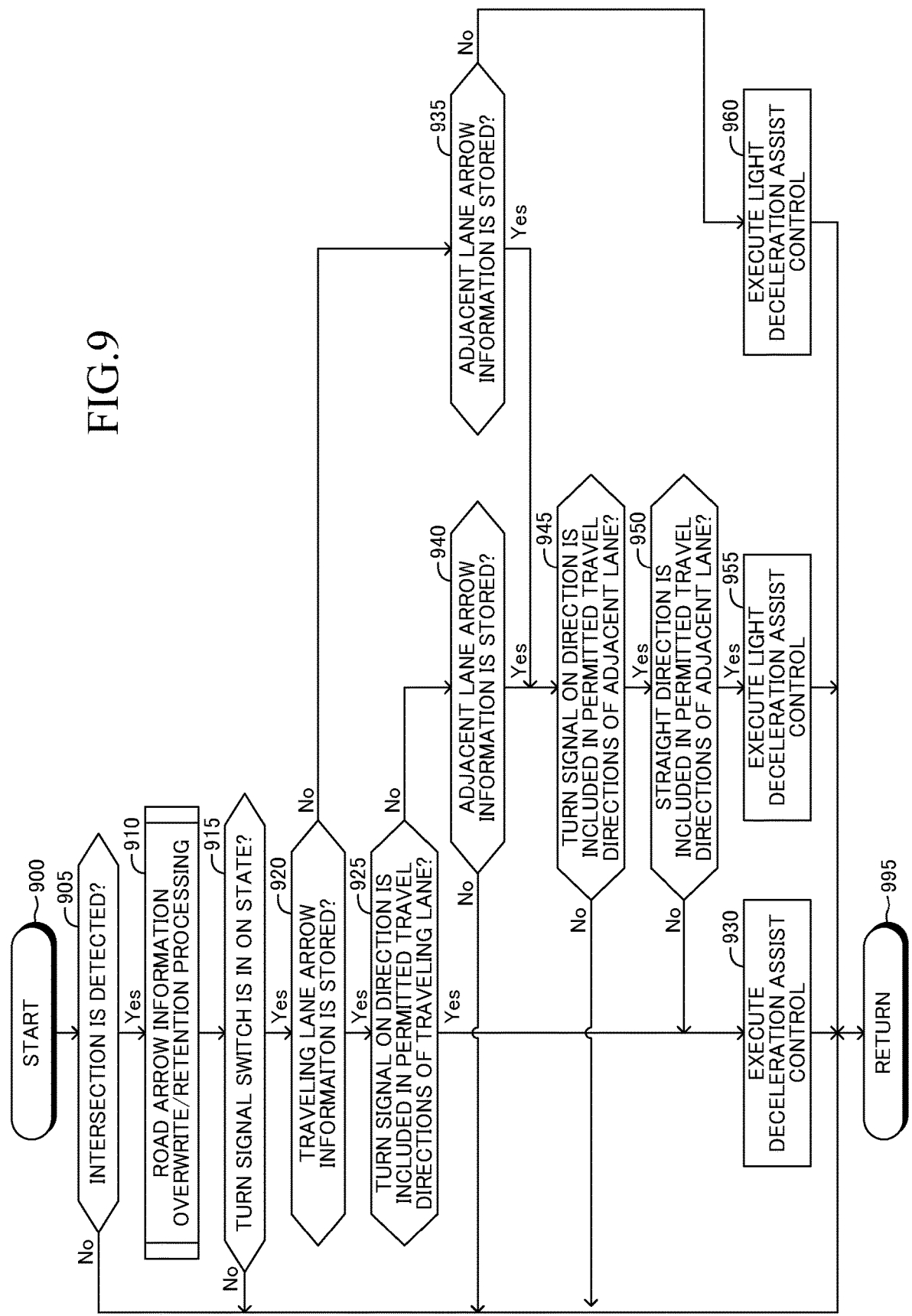

DRIVING SUPPORT APPARATUS, DRIVING SUPPORT METHOD, AND NON-TRANSITORY COMPUTER-READABLE STORAGE MEDIUM

BACKGROUND OF THE INVENTION

1. Field of the Invention

The present invention relates to a driving support apparatus, a driving support method, and a non-transitory computer-readable storage medium, each of which being capable of executing driving support control including pre-right/left-turn deceleration assist control of assisting in deceleration of a vehicle before a right or left turn at an intersection and/or pre-right/left-turn warning control of warning a driver of the vehicle before a right or left turn at an intersection.

2. Description of the Related Art

In recent years, technologies for executing driving support control of supporting decelerating a speed of a vehicle (vehicle speed) to a predetermined target vehicle speed before a right or left turn at an intersection have been researched and developed. The driving support control includes at least one of pre-right/left-turn deceleration assist control or pre-right/left-turn warning control. The pre-right/left-turn deceleration assist control is control of automatically applying a braking force to the vehicle so that a deceleration of the vehicle matches a target deceleration and thereby assisting in deceleration of the vehicle before a right or left turn at an intersection. The pre-right/left-turn warning control is control of warning a driver of the vehicle and thereby prompting the driver to perform a deceleration operation before a right or left turn at an intersection.

For example, in Japanese Patent Application Laid-open No. 2011-129013, there is described a travel support apparatus configured to issue a warning before a vehicle enters an intersection when the vehicle speed exceeds a predetermined vehicle speed (vehicle speed at which the vehicle can safely turn at the intersection) before the vehicle performs a right or left turn at the intersection.

Such a travel support apparatus may be configured to determine whether or not a vehicle is going to turn right or left at an intersection based on, for example, a direction indicator switch (a switch capable of detecting an operation state of a turn signal lever) and a road arrow marking on a traveling lane (lane on which the vehicle is traveling), and when the vehicle is going to turn right or left, to execute the aforementioned driving support control.

Specifically, the travel support apparatus may be configured to determine that the vehicle is going to turn right or left when a direction corresponding to an operation state of the turn signal lever detected by the direction indicator switch (that is, a right direction or a left direction) is included in permitted travel directions of a road arrow marking on the traveling lane.

However, according to this configuration, a timing at which the driving support control is executed may be delayed. For example, let us assume that the vehicle is going to turn right or left at an intersection after changing a lane with a turn signal lever having been operated since before changing the lane. In this case, it is desired that the driving support control is executed before the lane change and thereby the vehicle can properly decelerate to a target vehicle speed before the vehicle turns right or left at the intersection. However, the travel support apparatus determines whether or not the vehicle is going to turn right or left based on a road arrow marking on the traveling lane. Therefore, it is impossible to properly determine whether or not the vehicle is going to turn right or left when the road arrow marking on the traveling lane cannot be recognized (typically, when the road arrow marking is faint or when another vehicle is positioned on the road arrow marking). Besides, when a road arrow marking on the traveling lane includes only a straight arrow, a direction corresponding to an operation state of the turn signal lever is not included in permitted travel directions (a straight direction) of the road arrow marking, and thus it is determined that the vehicle is not going to turn right or left. In these cases, the travel support apparatus is to determine whether or not the vehicle is not going to turn right or left for the first time at a time point at which the travel support apparatus recognizes a road arrow marking on a new traveling lane after the lane change, and hence the timing at which the driving support control is executed may be delayed. This is particularly noticeable when a lane after the lane change is a right-turn-only lane or a left-turn-only lane.

SUMMARY OF THE INVENTION

The present invention has been made in order to cope with the above-mentioned problems. That is, one object of the present invention is to provide a technology capable of executing driving support control at an appropriate timing.

According to at least one embodiment of the present invention, there is provided a driving support apparatus (hereinafter also referred to as "apparatus of the present invention") including: a surrounding information acquisition device (11, 12) configured to acquire information relating to a road marking and an intersection present in a front area, which is an area including a road surface in front of a vehicle, as surrounding information; a steering information acquisition device (15) configured to acquire information including whether or not steering operation is being performed by a driver of the vehicle as steering information; and a control unit (10) including a storage device.

The control unit (10) is configured to: store (Step 1020), in a case in which an intersection is detected (Step 905: Yes) based on the surrounding information, when a road arrow marking is detected (Step 1010: Yes) on a traveling lane which is a lane on which the vehicle is traveling or on an adjacent lane which is a lane adjacent to the traveling lane, road arrow information which is information including the road arrow marking and permitted travel directions of a lane indicated by the road arrow marking, in the storage device in association with the detected intersection for each lane; execute, when a predetermined first execution condition including an intersection being detected based on the surrounding information is satisfied, driving support control including at least one of pre-right/left-turn deceleration assist control of automatically applying a braking force to the vehicle so that a deceleration of the vehicle matches a target deceleration and thereby assisting in deceleration of the vehicle to a predetermined target vehicle speed before the vehicle performs one of a right turn or a left turn at the detected intersection, or pre-right/left-turn warning control of warning the driver and thereby prompting the driver to perform a deceleration operation before the vehicle performs one of a right turn or a left turn at the detected intersection; and determine (Step 925, Step 950), when a precondition is satisfied (Step 915: Yes), the precondition being satisfied in a case in which it is determined that an intersection is detected based on the surrounding information and that steering operation is being performed by the driver based on the steering information, whether or not the first execution condition is satisfied based on the steering operation being performed and traveling lane arrow information which is the road arrow information of the traveling lane or adjacent lane arrow information which is the road arrow information of the adjacent lane, each of the traveling lane arrow information and the adjacent lane arrow information being stored in the storage device.

In the apparatus of the present invention, whether or not the first execution condition (an execution condition of the driving support control) is satisfied is determined based not only on the traveling lane arrow information but also on the adjacent lane arrow information. Therefore, even in a case in which it is determined that the first execution condition is not satisfied based on the traveling lane arrow information, it is possible to determine whether or not the first execution condition is satisfied based on the adjacent lane arrow information. Accordingly, compared with a configuration in which a determination is made based only on the traveling lane arrow information, a situation in which a timing at which whether or not the first execution condition is satisfied is determined is delayed is less likely to occur. As a result, the driving support control can be executed at an appropriate timing.

In one aspect of the present invention, the control unit (10) is configured to: determine, in a first case (Step 920: Yes) in which the precondition is satisfied and the traveling lane arrow information is stored in the storage device, that the first execution condition is satisfied when a first direction condition is satisfied (Step 925: Yes), the first direction condition being satisfied in a case in which a direction corresponding to the steering operation being performed is included in permitted travel directions of the traveling lane indicated by the traveling lane arrow information; determine, in a second case (Step 935: Yes, Step 940: Yes) in which the precondition is satisfied, either the traveling lane arrow information is not stored in the storage device (Step 920: No) or the first direction condition is not satisfied (Step 925: No), and the adjacent lane arrow information is stored in the storage device, that the first execution condition is satisfied when a second direction condition is satisfied (Step 950: No), the second direction condition being satisfied when a direction corresponding to the steering operation being performed is included in permitted travel directions of the adjacent lane indicated by the adjacent lane arrow information and a straight direction is not included in the permitted travel directions; and determine, in the second case (Step 935: Yes, Step 940: Yes), that the first execution condition is not satisfied when the second direction condition is not satisfied (Step 945: No, Step 950: Yes).

When the first direction condition is satisfied, it is highly likely that the vehicle is going to turn right or left at the intersection. Thus, by the apparatus of the present invention determining that the first execution condition is satisfied in a case in which the first direction condition is satisfied, the driving support control can be appropriately executed in a situation in which this control is required.

When the second direction condition is satisfied, the adjacent lane is either a right-turn-only lane or a left-turn-only lane. Therefore, it is highly likely that the vehicle is going to turn right or left after changing a lane to this adjacent lane. Hence, by the apparatus of the present invention determining that the first execution condition is satisfied also in a case in which the second direction condition is satisfied, the driving support control can be appropriately executed in a situation in which this control is required.

On the other hand, when the second direction condition is not satisfied due to the direction corresponding to the steering operation not being included in the permitted travel directions of the adjacent lane, it is highly likely that the vehicle is only going to change a lane (that is, the vehicle is not going to turn right or left). Besides, when the direction corresponding to the steering operation is included in the permitted travel directions of the adjacent lane, yet the straight direction is also included in this permitted travel directions, it is difficult to determine (judge) whether the vehicle is going to turn right or left after the lane change or the vehicle is only going to change a lane. Therefore, by the apparatus of the present invention determining that the first execution condition is not satisfied in these cases, it is possible to suppress the occurrence of an unrequired operation of the driving support control.

In this case, the control unit (10) is configured to: further execute, when a predetermined second execution condition including an intersection being detected based on the surrounding information is satisfied, light driving support control including at least one of pre-right/left-turn light deceleration assist control, a degree thereof at which the vehicle decelerates to the target vehicle speed being lightened compared with the pre-right/left-turn deceleration assist control, or pre-right/left-turn light warning control, a degree thereof of warning the driver being lightened compared with the pre-right/left-turn warning control; and determine, in the second case (Step 935: Yes, Step 940: Yes), that the second execution condition is satisfied when the second direction condition is not satisfied (step 950: Yes) due to a direction corresponding to the steering operation being performed being included in permitted travel directions of the adjacent lane indicated by the adjacent lane arrow information and a straight direction being included in the permitted travel directions.

When the direction corresponding to the steering operation is included in the permitted travel directions of the adjacent lane, yet the straight direction is also included in this permitted travel directions, it is difficult to determine whether the vehicle is going to turn right or left after the lane change or the vehicle is only going to change a lane. Therefore, by the light driving support control instead of the driving support control being executed, it is possible to decelerate the vehicle to some extent before changing a lane when the vehicle is going to turn right or left after the lane change, while it is possible to reduce a degree that the driver feels an unnecessary sense of deceleration when the vehicle is only going to change a lane.

In one aspect of the present invention, the control unit (10) is configured to: further execute, when a predetermined second execution condition including an intersection being detected based on the surrounding information is satisfied, light driving support control including at least one of pre-right/left-turn light deceleration assist control, a degree thereof at which the vehicle decelerates to the target vehicle speed being lightened compared with the pre-right/left-turn deceleration assist control, or pre-right/left-turn light warning control, a degree thereof of warning the driver being lightened compared with the pre-right/left-turn warning control; and determine, in a third case (Step 935: No) in which the precondition is satisfied, and neither the traveling lane arrow information nor the adjacent lane arrow information is stored in the storage device, that the second execution condition is satisfied.

In a third case, the traveling lane arrow information is not stored in the storage device of the control unit. This is because the road arrow marking on the traveling lane is invisible (visually unrecognizable) due to a presence of another vehicle or faintness during a period from a time point at which a certain arbitrary intersection was first detected to a current time point. Thus, there is actually a possibility that the direction corresponding to the steering operation is included in the permitted travel directions of the traveling direction. In other words, there is a possibility that the vehicle is going to turn right or left on the traveling lane. Accordingly, by the light driving support control being executed in the third case, it is possible to decelerate the vehicle to some extent when the vehicle is going to turn right or left on the traveling lane, while it is possible to reduce the degree that the driver feels an unnecessary sense of deceleration when the vehicle is not going to do so (in other words, the vehicle is only going to change a lane).

In one aspect of the present invention, the control unit (10) is configured to: determine, in a fourth case (Step 940: No) in which the precondition is satisfied, the first direction condition is not satisfied, and the adjacent lane arrow information is not stored in the storage device, that neither the first execution condition nor the second execution condition is satisfied.

In the fourth case, the traveling lane arrow information is stored in the storage device, and the direction corresponding to the steering operation is not included in the permitted travel directions of the traveling lane included in this information. Thus, it is extremely less likely that the vehicle is going to turn right or left at least on the traveling lane.

Therefore, by either the deceleration assist control or the light deceleration assist control not being executed in the fourth case, it is possible to suppress the occurrence of unrequired operations of these controls.

In one aspect of the present invention, the steering information acquisition device is a direction indicator switch (15) configured to detect an operation state of an operation device (WL) to be operated by the driver in order to operate a direction indicator (18), and is configured to acquire, as the steering information, whether or not the operation device (WL) is under a state of being operated by the driver.

With this configuration, the operation state of the operation device can be appropriately detected, and thus it is possible to acquire the steering information with high reliability.

According to at least one embodiment of the present invention, there is provided a driving support method including: causing a surrounding information acquisition device (11, 12) to acquire information relating to a road marking and an intersection present in a front area, which is an area including a road surface in front of a vehicle, as surrounding information; causing a steering information acquisition device (15) to acquire information including whether or not steering operation is being performed by a driver of the vehicle as steering information; storing (Step 1020), in a case in which an intersection is detected (Step 905: Yes) based on the surrounding information, when a road arrow marking is detected (Step 1010: Yes) on a traveling lane which is a lane on which the vehicle is traveling or on an adjacent lane which is a lane adjacent to the traveling lane, road arrow information which is information including the road arrow marking and permitted travel directions of a lane indicated by the road arrow marking, in a storage device in association with the detected intersection for each lane; executing, when a predetermined first execution condition including an intersection being detected based on the surrounding information is satisfied, driving support control including at least one of pre-right/left-turn deceleration assist control of automatically applying a braking force to the vehicle so that a deceleration of the vehicle matches a target deceleration and thereby assisting in deceleration of the vehicle to a predetermined target vehicle speed before the vehicle performs one of a right turn or a left turn at the detected intersection, or pre-right/left-turn warning control of warning the driver and thereby prompting the driver to perform a deceleration operation before the vehicle performs one of a right turn or a left turn at the detected intersection; and determining (Step 925, Step 950), when a precondition is satisfied (Step 915: Yes), the precondition being satisfied in a case in which it is determined that an intersection is detected based on the surrounding information and that steering operation is being performed by the driver based on the steering information, whether or not the first execution condition is satisfied based on the steering operation being performed and traveling lane arrow information which is the road arrow information of the traveling lane or adjacent lane arrow information which is the road arrow information of the adjacent lane, each of the traveling lane arrow information and the adjacent lane arrow information being stored in the storage device.

According to the above-mentioned driving support method, driving support control can be appropriately executed.

According to at least one embodiment of the present invention, there is provided a non-transitory computer-readable storage medium storing a driving support program for causing a computer to execute processing including: causing a surrounding information acquisition device (11, 12) to acquire information relating to a road marking and an intersection present in a front area, which is an area including a road surface in front of a vehicle, as surrounding information; causing a steering information acquisition device (15) to acquire information including whether or not steering operation is being performed by a driver of the vehicle as steering information; storing (Step 1020), in a case in which an intersection is detected (Step 905: Yes) based on the surrounding information, when a road arrow marking is detected (Step 1010: Yes) on a traveling lane which is a lane on which the vehicle is traveling or on an adjacent lane which is a lane adjacent to the traveling lane, road arrow information which is information including the road arrow marking and permitted travel directions of a lane indicated by the road arrow marking, in a storage device in association with the detected intersection for each lane; executing, when a predetermined first execution condition including an intersection being detected based on the surrounding information is satisfied, driving support control including at least one of pre-right/left-turn deceleration assist control of automatically applying a braking force to the vehicle so that a deceleration of the vehicle matches a target deceleration and thereby assisting in deceleration of the vehicle to a predetermined target vehicle speed before the vehicle performs one of a right turn or a left turn at the detected intersection, or pre-right/left-turn warning control of warning the driver and thereby prompting the driver to perform a deceleration operation before the vehicle performs one of a right turn or a left turn at the detected intersection; and determining (Step 925, Step 950), when a precondition is satisfied (Step 915: Yes), the precondition being satisfied in a case in which it is determined that an intersection is detected based on the surrounding information and that steering operation is being performed by the driver based on the steering information, whether or not the first execution condition is satisfied based on the steering operation being performed and traveling lane arrow information which is the road arrow information of the traveling lane or adjacent lane arrow information which is the road arrow information of the adjacent lane, each of the traveling lane arrow information and the adjacent lane arrow information being stored in the storage device.

Driving support control can be appropriately executed by causing a computer to execute the driving support program stored on the above-mentioned storage medium.

In the above description, in order to facilitate understanding of the invention, reference symbols used in embodiments of the present invention are enclosed in parentheses and are assigned to each of the constituent features of the invention corresponding to the embodiments. However, each of the constituent features of the invention is not limited to the embodiments defined by the reference symbols.

BRIEF DESCRIPTION OF THE DRAWINGS

FIG. 9 is a flowchart for illustrating a routine to be executed by a CPU of a pre-right/left-turn deceleration assist ECU of the apparatus of the embodiment.

DESCRIPTION OF THE EMBODIMENTS

Embodiment (Configuration)

Figure 1:
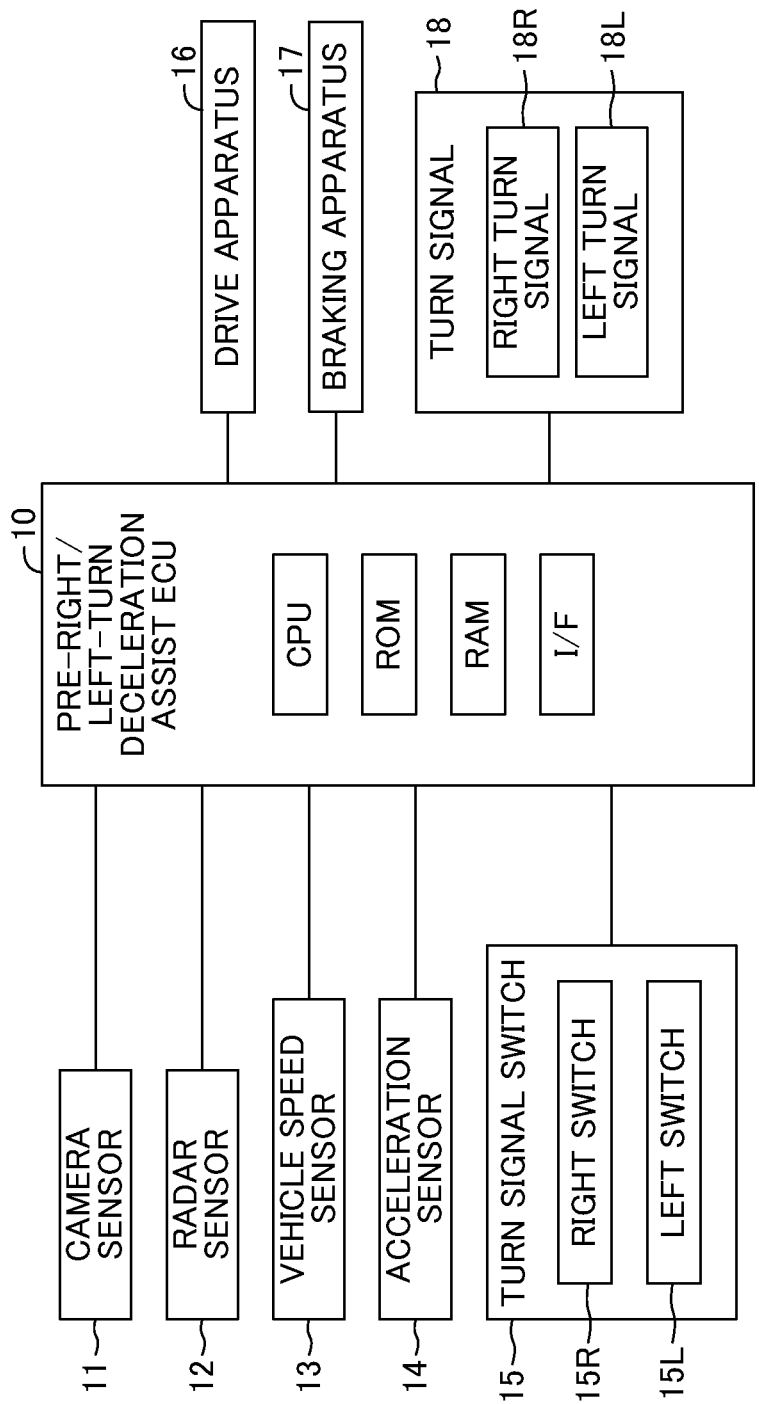
FIG. 1 is a schematic configuration diagram of a driving support apparatus (apparatus of an embodiment) according to an embodiment of the present invention.

Now, a driving support apparatus according to an embodiment of the present invention (hereinafter also referred to as "apparatus of the embodiment") is described with reference to the drawings. As illustrated in FIG. 1, the apparatus of the embodiment includes a pre-right/left-turn deceleration assist ECU 10 and a camera sensor 11, a radar sensor 12, a vehicle speed sensor 13, an acceleration sensor 14, a turn signal switch 15, a drive apparatus 16, a braking apparatus 17, and a turn signal 18, each of which is connected to the pre-right/left-turn deceleration assist ECU 10. The pre-right/left-turn deceleration assist ECU 10 includes a microcomputer as a main part. "ECU" is an abbreviation for electronic control unit. The microcomputer includes, for example, a central processing unit (CPU), a read-only memory (ROM), a random-access memory (RAM), and an interface (I/F). The CPU implements various functions by executing instructions (programs, or routines) stored in the ROM. A part of the functions may be implemented by another ECU. In the following, a vehicle in which the apparatus of the embodiment is mounted (in other words, the vehicle including the apparatus of the embodiment) is referred to as "own vehicle."

The pre-right/left-turn deceleration assist ECU 10 is configured to acquire information or signals output, generated, or detected by the sensors and switches 11 to 15 every time a predetermined time elapses, and to control the elements 16 to 18 based on the acquired signals. The pre-right/left-turn deceleration assist ECU 10 is hereinafter also simply referred to as "ECU 10."

The camera sensor 11 is installed on a back surface of a room mirror (inner mirror or rear-view mirror) of the own vehicle. The camera sensor 11 photographs the landscape of a front area, which is an area including the road surface in front of the own vehicle, and recognizes (detects) road markings present in the front area based on the photographed image data. Examples of the road markings include dividing lines extending in front of the own vehicle and road arrow markings on a traveling lane and adjacent lanes. The traveling lane is a lane on which the own vehicle is traveling. The adjacent lanes are lanes adjacent to the traveling lane, and include a right-side adjacent lane adjacent to the traveling lane on a right side thereof and a left-side adjacent lane adjacent to the traveling lane on a left side thereof. A lane is defined as an area between two adjacent dividing lines. The road arrow marking is an arrow-shaped road marking indicating permitted travel directions of the lane, and a plurality of road arrow markings are generally arranged before an intersection at intervals in the direction in which the lane extends. Examples of road arrow markings include "traffic classification by travel direction" and "travel direction." The "traffic classification by travel direction" road arrow marking is generally arranged on each lane of a road having two or more lanes on each side. Meanwhile, the "travel direction" road arrow marking is arranged at a point at which it is required to indicate the direction in which vehicles can travel, and hence the lane type in which this road arrow marking is arranged does not matter.

Figure 2:
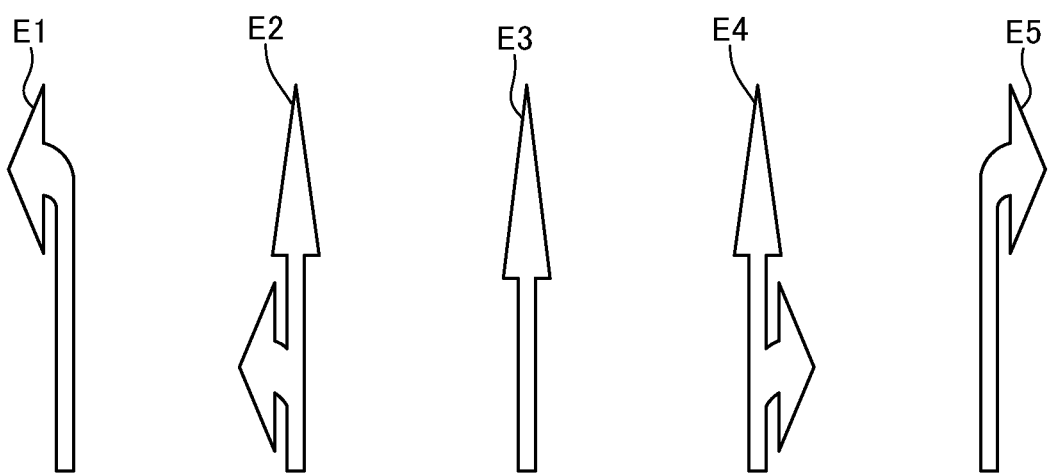
FIG. 2 is a diagram for illustrating types of road arrow markings.

FIG. 2 is a diagram for illustrating the main types of road arrow markings. As illustrated in FIG. 2, the arrow of a road arrow marking E1 points to the left, and hence the permitted travel direction of the lane in which the arrow marking E1 is arranged is the left-turn direction (that is, the lane is a left-turn-only lane). The arrows of a road arrow marking E2 point to the front and to the left, and hence the permitted travel directions of the lane in which the arrow marking E2 is arranged are the straight direction and the left-turn direction. The arrow of a road arrow marking E3 points to the front, and hence the permitted travel direction of the lane in which the arrow marking E3 is arranged is the straight direction. The arrows of a road arrow marking E4 point to the front and to the right, and hence the permitted travel directions of the lane in which the arrow marking E4 is arranged are the straight direction and the right-turn direction. The arrow of a road arrow marking E5 points to the right, and hence the permitted travel direction of the lane in which the arrow marking E5 is arranged is the right-turn direction (that is, the lane is a right-turn-only lane).

Returning to FIG. 1 to continue the description, the camera sensor 11 includes an image recognition ECU (not shown), and recognizes road arrow markings by machine learning. Specifically, the image recognition ECU learns in advance learning data including all road arrow markings that can be marked on the road surface. The road arrow markings included in the learning data include, for example, arrow markings having different sizes and/or shapes depending on the region, and arrow markings having various degrees of faintness. The road arrow markings are stored in the learning data in association with the permitted travel direction indicated by the relevant arrow marking. The image recognition ECU recognizes the road arrow marking from the image data by using the learning result of the learning data, and calculates the permitted travel direction of the road arrow marking.

In addition, the camera sensor 11 recognizes (detects), in addition to the road markings, a traffic light present in the front area of the own vehicle based on the image data, and calculates a relative relationship between the own vehicle and the traffic light. As used herein, the "relative relationship between the own vehicle and the traffic light" includes the distance from the own vehicle to the traffic light and the direction, for example, of the traffic light with respect to the own vehicle.

In addition to the traffic light, the camera sensor 11 may be configured to be able to recognize moving objects such as another vehicle or a pedestrian, and stationary objects such as a median strip and a guardrail. The "relative relationship between the own vehicle and the traffic light" calculated by the camera sensor 11 corresponds to an example of "information relating to an intersection."

The camera sensor 11 acquires the information obtained in this manner as "camera surrounding information," and outputs the camera surrounding information to the ECU 10. The camera sensor 11 corresponds to an example of a "surrounding information acquisition device." The ECU 10 may acquire information relating to a road marking and an intersection present in the front area of the own vehicle from a navigation system (not shown). In this case, the navigation system corresponds to an example of the "surrounding information acquisition device."

The radar sensor 12 is installed in a center portion of a front grill of the own vehicle. The radar sensor 12 irradiates radio waves in the millimeter wave band to the front area of the own vehicle, and when a three-dimensional object is present, receives reflected waves from the three-dimensional object. The radar sensor 12 calculates the presence/absence of a three-dimensional object and the relative relationship between the own vehicle and the three-dimensional object based on the irradiation timing and reception timing of the radio waves. The radar sensor 12 acquires the information obtained in this manner as "radar surrounding information," and outputs the radar surrounding information to the ECU 10. The radar sensor 12 corresponds to an example of the "surrounding information acquisition device."

The installation position of the radar sensor 12 is not limited to the central portion of the front grill, and may be installed, for example, in a central portion of a front bumper or in at least one of the left corner or the right corner of the front bumper.

The ECU 10 detects the road arrow marking of the traveling lane based on the camera surrounding information, and identifies the permitted travel direction of the traveling lane indicated by the arrow marking. Further, the ECU 10 detects an intersection by detecting a traffic light based on the camera surrounding information and the radar surrounding information. Through detection of the traffic light based on the radar surrounding information in addition to the camera surrounding information, the calculation accuracy of the relative relationship between the own vehicle and the traffic light is improved. That is, the detection accuracy of the intersection is improved. The camera surrounding information and the radar surrounding information correspond to an example of "surrounding information." However, the apparatus of the embodiment is not required to include the radar sensor 12. In this case, the camera surrounding information alone corresponds to an example of the "surrounding information."

The vehicle speed sensor 13 generates a signal corresponding to a traveling speed of the own vehicle (hereinafter referred to as "vehicle speed"). The ECU 10 acquires the signal generated by the vehicle speed sensor 13, and calculates the vehicle speed based on the signal.

The acceleration sensor 14 generates a signal corresponding to the acceleration or deceleration of the own vehicle. The ECU 10 acquires the signal generated by the acceleration sensor 14, and calculates the acceleration or deceleration based on the signal. Deceleration has a negative value. As the deceleration becomes smaller, the degree of deceleration becomes larger.

The turn signal switch 15 is arranged on a turn signal lever WL (not shown). The turn signal lever WL is an operation device to be operated by the driver in order to operate (flash on and off) a turn signal, and is arranged on a steering column. The turn signal lever WL is operated when the own vehicle turns left, turns right, or changes lanes based on a driving operation by the driver.

Specifically, the turn signal lever WL is configured to be movable to a right position PR or a left position PL, which are each a position rotated to the right or to the left, respectively, about a support shaft by a predetermined angle from a neutral position. The turn signal switch 15 includes a right switch 15R and a left switch 15L. The right switch 15R is turned on (generates an ON signal) when the turn signal lever WL is in the right position PR, and is turned off (generates an OFF signal) in other cases. The left switch 15L is turned on (generates an ON signal) when the turn signal lever WL is in the left position PL, and is turned off (generates an OFF signal) in other cases. That is, the turn signal switch 15 acquires as steering information whether or not the turn signal lever WL is under a state in which the turn signal lever WL is being operated (that is, a state in which the turn signal lever WL is in the right position PR or in the left position PL). The ECU 10 detects an operation state of the turn signal lever WL based on the steering information (that is, based on the signal acquired from the turn signal switch 15). The turn signal lever WL corresponds to an example of an "operation device". The turn signal switch 15 corresponds to an example of a "steering information acquisition device" or a "direction indicator switch."

The drive apparatus 16 is an apparatus for applying, to drive wheels of the own vehicle, a driving force for causing the own vehicle to travel. The braking apparatus 17 is an apparatus for applying, to wheels of the own vehicle, a braking force for braking the own vehicle.

The ECU 10 causes the drive apparatus 16 and/or the braking apparatus 17 to execute pre-right/left-turn deceleration assist control or pre-right/left-turn light deceleration assist control by controlling the operation of the drive apparatus 16 and/or the braking apparatus 17 to control the driving force and/or the braking force. The pre-right/left-turn deceleration assist control and pre-right/left-turn light deceleration assist control are both a type of driving support control.

The pre-right/left-turn deceleration assist control is control which automatically applies a braking force to the own vehicle so that a deceleration of the own vehicle matches a target deceleration (described later) and thereby assists in deceleration of the own vehicle before the own vehicle performs a right or left turn at an intersection. The target deceleration is a deceleration required in order to reduce the vehicle speed to a predetermined target vehicle speed, and may be calculated by the ECU 10. The target vehicle speed is the upper limit value of the vehicle speed at which the vehicle can properly (safely) turn right or left at the intersection. The target vehicle speed can be set in advance by experiment or simulation.

The pre-right/left-turn light deceleration assist control is control, a degree thereof at which the vehicle decelerates to the target vehicle speed being lightened compared with the pre-right/left-turn deceleration assist control.

Hereinafter, the pre-right/left-turn deceleration assist control is also referred to as "deceleration assist control" and the pre-right/left-turn light deceleration assist control is also referred to as "light deceleration assist control."

Figure 3:
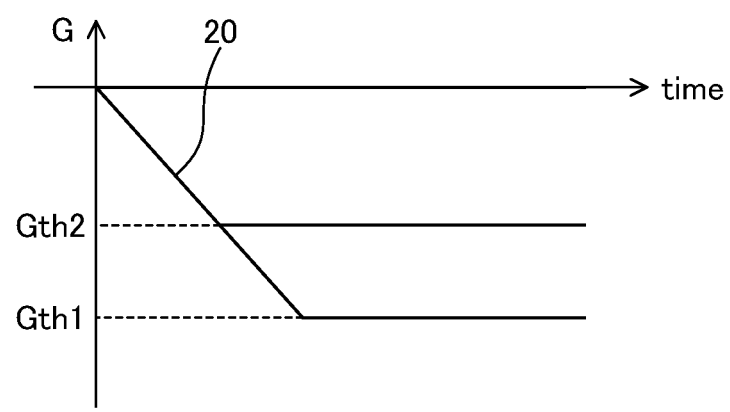
FIG. 3 is a graph for showing temporal transition of a deceleration of a vehicle of when pre-right/left-turn deceleration assist control and pre-right/left-turn light deceleration assist control are executed.

FIG. 3 is a graph for showing temporal transition of a deceleration G of the own vehicle of when the deceleration assist control and the light deceleration assist control are executed. For the deceleration assist control, a value of Gth1 (<0) is set as a lower limit value of the target deceleration. For the light deceleration assist control, a value of Gth2 (<0) is set as a lower limit value of the target deceleration. The lower limit value Gth2 is larger than the lower limit value Gth1.

As shown in FIG. 3, in this embodiment, as for both controls, when a target deceleration is calculated, a deceleration G of the own vehicle continues to decrease at a constant jark until the deceleration G reaches the target deceleration, and maintains a value of a time point at which the deceleration G reaches the target deceleration as the deceleration G. Here, a jark is a time rate of change of a deceleration, and is equivalent to a slope of a solid line 20. However, when a target deceleration is less than the lower limit value Gth (Gth=Gth1 when the deceleration assist control is being executed and Gth=Gth2 when the light deceleration assist control is being executed), the deceleration G stops to decrease at a time point at which the deceleration G reaches the lower limit value Gth and maintains the lower limit value Gth as the deceleration G. According to this configuration, in a case where the light deceleration assist control is executed, there is no difference in a deceleration degree compared with the deceleration assist control when the target deceleration is more than or equal to the lower limit value Gth2, however, the deceleration degree is lightened compared with the deceleration assist control when the target deceleration is less than the lower limit value Gth2.

Figure 4:
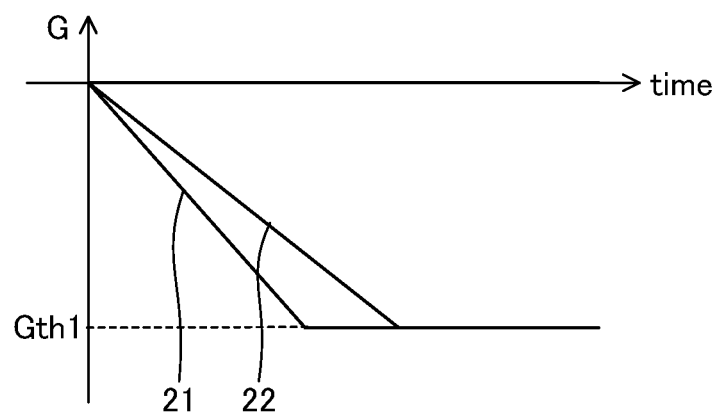
FIG. 4 is another graph for showing temporal transition of a deceleration of the vehicle of when the pre-right/left-turn deceleration assist control and the pre-right/left-turn light deceleration assist control are executed.

It should be noted that the temporal transition of the deceleration G of the own vehicle of when the deceleration assist control and the light deceleration assist control are executed is not limited to a behavior shown in FIG. 3. For example, as shown in FIG. 4, a lower limit value of the target deceleration of the deceleration assist control and the light deceleration assist control may be set to the same value of Gth1. Besides, a jark (a slope of a solid line 22) of when the light deceleration assist control is executed may be set larger than a jark (a slope of a solid line 21) of when the deceleration assist control is executed (in other words, a deceleration degree may be lightened). According to this configuration, the deceleration degree of the light deceleration assist control is lightened compared with that of the deceleration assist control.

The turn signal 18 includes a right turn signal 18R and a left turn signal 18L. The right turn signal 18R is installed in a right front corner and a right rear corner of the own vehicle. The left turn signal 18L is installed in a left front corner and a left rear corner of the own vehicle. During the period in which the turn signal lever WL is positioned at the right position PR or the left position PL (that is, during the period in which the right switch 15R or the left switch 15L is generating an ON signal), the ECU 10 causes the corresponding turn signal 18 (18R, 18L) to flash on and off. The turn signal 18 may be controlled by another ECU (for example, a meter ECU). The turn signal 18 corresponds to an example of the "direction indicator."

(Details of Operation)

Next, the details of the operation of the ECU 10 are described. The ECU 10 executes the deceleration assist control when a first execution condition is satisfied, and executes the light deceleration assist control when a second execution condition is satisfied. The first execution condition is satisfied when all of the following conditions 1 to 4 are satisfied.

(Condition 1) An intersection has been detected.
(Condition 2) The turn signal switch 15 is in the ON state.
(Condition 3) Road arrow information (described later) of a traveling lane is stored in the RAM of the ECU 10.
(Condition 4) The permitted travel direction(s) of the traveling lane included in the road arrow information of the traveling lane include(s) the ON direction of the turn signal switch 15.

The ECU 10 determines that the condition 1 is satisfied when a traffic light is detected based on the camera surrounding information and the radar surrounding information. The camera sensor 11 may be configured to recognize a warning sign of a road intersection and thereby to calculate a relative relationship between the own vehicle and the warning sign. The ECU 10 may detect an intersection by detecting the warning sign based on the camera surrounding information (and the radar surrounding information) including that relative relationship.

In a case in which the condition 1 is satisfied, the ECU 10 determines that the condition 2 is satisfied when the signal acquired from the turn signal switch 15 includes the ON signal of the right switch 15R or the left switch 15L. The conditions 1 and 2 correspond to an example of a "precondition".

The condition 2 may be set to be satisfied when a magnitude(s) of a detection value(s) of a steering angle sensor and/or a steering torque sensor is(are) more than or equal to a predetermined threshold. The steering angle sensor and/or the steering torque sensor is(are) a sensor(s) for detecting an input value(s) based on a steering operation by the driver.

In a case in which the condition 1 is satisfied, when the permitted travel directions indicated by the road arrow marking of each lane detected based on the camera surrounding information are identified, the ECU 10 stores road arrow information, which is "information including the road arrow marking and the permitted travel directions of the corresponding lane indicated by the road arrow marking," in the RAM for each lane in association with the intersection (the intersection detected based on satisfaction of the condition 1). The ECU 10 is configured to store road arrow information relating to road arrow markings on the traveling lane and the adjacent lanes. Hereinafter, the road arrow information relating to the road arrow marking on the traveling lane is referred to as "traveling lane arrow information," and the road arrow information relating to the road arrow marking on the right-side adjacent lane is referred to as "right-side adjacent lane arrow information," and the road arrow information relating to the road arrow marking on the left-side adjacent lane is referred to as "left-side adjacent lane arrow information." In addition, when there is no need to differentiate the right-side adjacent lane arrow information from the left-side adjacent lane arrow information, they are simply referred to as "adjacent lane arrow information". Further, when there is no need to differentiate the traveling lane arrow information from the adjacent lane arrow information, they are simply referred to as "road arrow information."

When the road arrow marking is detected, the ECU 10 is configured to overwrite the road arrow information stored in the RAM with the road arrow information relating to the detected road arrow marking for each lane. When the road arrow marking is not detected, the ECU 10 is configured to retain the road arrow information stored in the RAM.

When the traveling lane arrow information is stored in the RAM in a case in which the conditions 1 and 2 are satisfied, the ECU 10 determines that the condition 3 is satisfied. A case in which the conditions 1 to 3 are satisfied corresponds to an example of a "first case".

The ECU 10 is configured to delete the road arrow information from the RAM at the time point at which there is a change from a state in which a certain intersection is detected (detection state) to a state in which the intersection is not detected (non-detection state) (typically, the time point at which the own vehicle V has passed through the intersection).

In a case in which the conditions 1 to 3 are satisfied (i.e., the first case), the ECU 10 determines that the condition 4 is satisfied when the direction of the turn signal switch 15 in the ON state (hereinafter, also referred to as a "turn signal ON direction") is included in the permitted travel directions of the traveling lane included in the traveling lane arrow information. For example, the condition 4 is satisfied when the permitted travel directions included in the traveling lane arrow information are "straight direction and left-turn direction" and the left switch 15L is in the ON state. The condition 4 corresponds to an example of a "first direction condition". In addition, the turn signal ON direction corresponds to an example of a "direction corresponding to a steering operation being executed".

Figure 5:
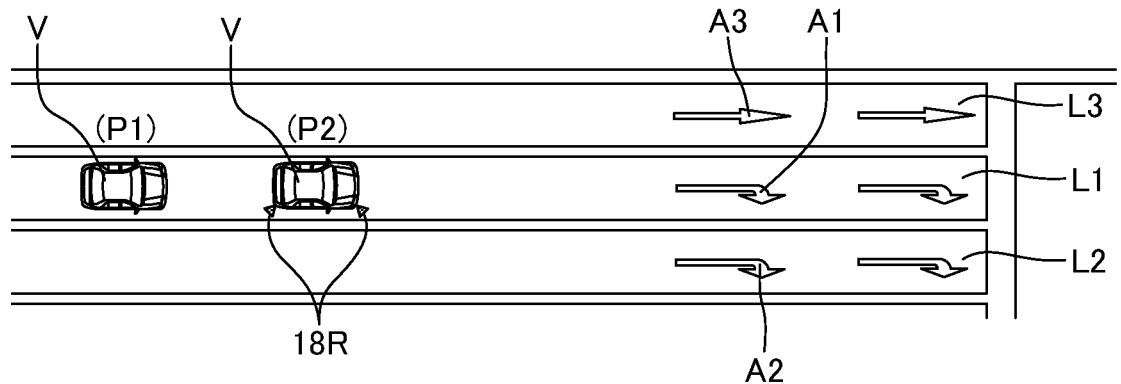
FIG. 5 is a diagram for illustrating a situation in which it is determined that a first execution condition is satisfied based on traveling lane arrow information.

A specific description is now given with reference to FIG. 5. FIG. 5 is a diagram for illustrating changes over time in the behavior of an own vehicle V which is going to turn right at an intersection present in the front area (not shown). In FIG. 5, the ECU 10 detects a traffic light (not shown) present in the front area for the first time at a position P1 and thereby detects the intersection for the first time. With this, the condition 1 is satisfied at the position P1. As for other diagrams (FIG. 6A to FIG. 9B) as well which are mentioned later, it is assumed that the condition 1 is satisfied at the position P1.

Next, at a position P2, the driver of the own vehicle V rotates the turn signal lever WL to the right to move the turn signal lever WL to the right position PR. As a result, at the position P2, the right switch 15R changes from the OFF state to the ON state, and hence the ECU 10 causes the right turn signal 18R to start flashing on and off. As a result, the condition 2 is satisfied. As for other diagrams (FIG. 6A to FIG. 9B) as well which are mentioned later, it is assumed that the condition 2 is satisfied at the position P2.

Here, when the intersection is detected, the ECU 10 detects a road arrow marking A1 on a traveling lane L1, a road arrow marking A2 on a right-side adjacent lane L2, and a road arrow marking A3 on a left-side adjacent lane L3, respectively. The road arrow markings A1 and A2 are the same type as the road arrow marking E5 in FIG. 2, and the road arrow marking A3 is the same type as the road arrow marking E3 in FIG. 2. Therefore, the ECU 10 stores traveling lane arrow information, which is "information including the road arrow marking A1 and the permitted travel direction (the right-turn direction) of the traveling lane L1 indicated by the road arrow marking A1," in the RAM in association with the intersection. In addition, the ECU 10 stores right-side adjacent lane arrow information, which is "information including the road arrow marking A2 and the permitted travel direction (the right-turn direction) of the right-side adjacent lane L2 indicated by the road arrow marking A2," and left-side adjacent lane arrow information, which is "the road arrow marking A3 and the permitted travel direction (the straight direction) of the left-side adjacent lane L3 indicated by the road arrow marking A3," in the RAM, respectively, in association with the intersection. As long as a road arrow marking is detected based on the camera surrounding information, the ECU 10 overwrites the road arrow information stored in the RAM with the latest road arrow information for each lane. With this configuration, at the position P1, the traveling lane arrow information and the right-side and left-side adjacent lane arrow information are started to be stored in the RAM, and at the position P2, the road arrow information are overwritten, and thus the condition 3 is satisfied.

At the position P2, the permitted travel direction (right-turn direction) of the traveling lane L1 included in the traveling lane arrow information includes the turn signal ON direction (right direction). Therefore, the condition 4 is satisfied.

As a result, the first execution condition is satisfied, and hence the ECU 10 starts deceleration assist control at the position P2. In the example of FIG. 5, deceleration of the own vehicle V is assisted before the own vehicle V turns right at the intersection, and hence the vehicle speed can be reduced to the target vehicle speed and the own vehicle V can turn right properly (safely).

Figure 6A:
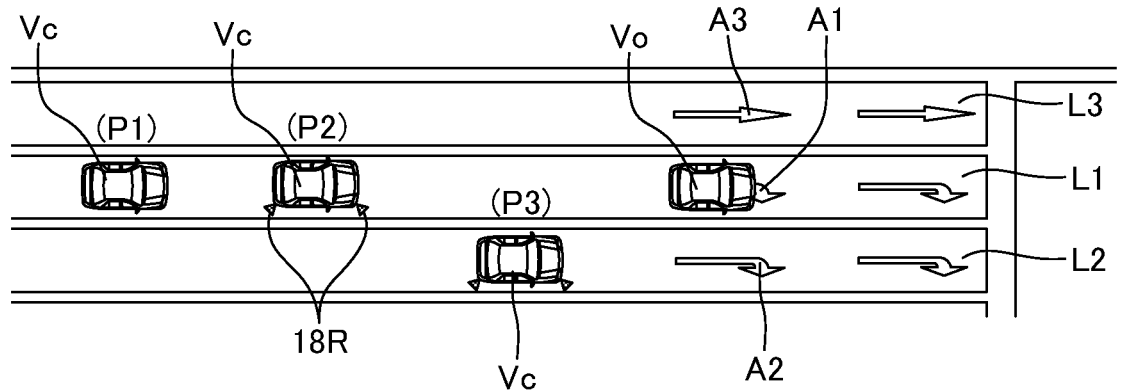
FIG. 6A is a diagram of a comparative example for illustrating a situation in which it is determined that the first execution condition is not satisfied based on the traveling lane arrow information.
Figure 6B:
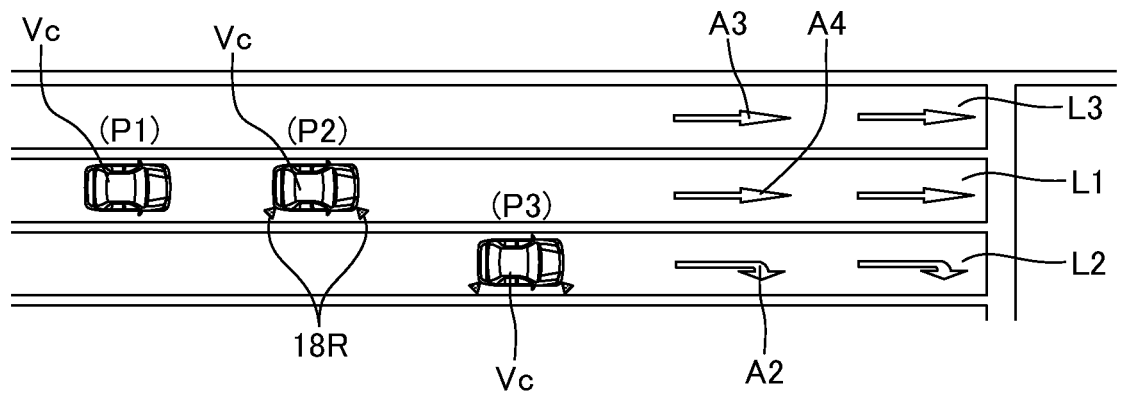
FIG. 6B is a diagram of a comparative example for illustrating another situation in which it is determined that the first execution condition is not satisfied based on the traveling lane arrow information.

A description of a driving support apparatus is now given as comparative examples with reference to FIG. 6A and FIG. 6B. This driving support apparatus is configured to detect only the road arrow marking on the traveling lane based on the camera surrounding information, and thereby to store only the traveling lane arrow information in the RAM in association with the intersection. In addition, this driving support apparatus is configured to determine that the first execution condition is satisfied when the aforementioned conditions 1 to 4 are all satisfied to execute the deceleration assist control.

FIG. 6A and FIG. 6B are diagrams for both illustrating changes over time in the behaviors of an own vehicle Vc (a vehicle on which the driving support apparatus of each of the comparative examples is mounted). The own vehicle Vc is going to turn right at an intersection (not shown) present in the front area after changing a lane to a right-side adjacent lane. In the examples of both FIG. 6A and FIG. 6B, the condition 1 is satisfied at the position P1 and the condition 2 is satisfied at the position P2.

In the example of FIG. 6A, another vehicle Vo is positioned on the road arrow marking A1 arranged at the front-most side of a plurality of road arrow markings on the lane L1, resulting in a situation in which the arrow marking A1 is covered by a body of the another vehicle Vo and thus is invisible (visually unrecognizable). In a case in which the another vehicle Vo has been stopped at this position during a period from a time point at which the intersection was first detected to a time point at which the own vehicle Vc reaches the position P2, the driving support apparatus cannot detect the road arrow marking A1 on the traveling lane L1 and thus the traveling lane arrow information is not stored in the RAM. Accordingly, in the example of FIG. 6A, the condition 3 is not satisfied even though the conditions 1 and 2 are satisfied at the position P2, and hence the first execution condition is not satisfied and the deceleration assist control is not executed.

On the other hand, in the example of FIG. 6B, during a period from a time point at which the intersection was first detected to a time point at which the own vehicle Vc reaches the position P2, the driving support apparatus detects a road arrow marking A4 on the traveling lane L1 and stores (overwrites) the traveling lane arrow information relating to the arrow marking A4 in association with the intersection. Therefore, the condition 3 is satisfied.

However, at the position P2, the permitted travel direction (the straight direction) of the traveling lane L1 included in the traveling lane arrow information does not include the turn signal ON direction. Thus, in the example of FIG. 6B, the condition 4 is not satisfied even though the conditions 1 to 3 are satisfied at the position P2 and thus the first execution condition is not satisfied and the deceleration assist control is not executed.

In the examples of FIG. 6A and FIG. 6B, when the own vehicle Vc thereafter changes a lane from the traveling lane L1 to a position P3 on the right-side adjacent lane L2, the lane L2 becomes a new traveling lane. Thus, the driving support apparatus detects, at a time point at which the own vehicle Vc has reached the position P3 by the lane change, the road arrow marking A2 on the traveling lane L2, stores in the RAM the traveling lane arrow information relating to this arrow marking A2 in association with the intersection, and subsequently, overwrites the traveling lane arrow information during a period in which the intersection has been detected. With this, the condition 3 is satisfied at the position P3.

In addition, at the position P3, the permitted travel direction (the right-turn direction) of the traveling lane L2 included in the traveling lane arrow information includes the turn signal ON direction. Accordingly, the condition 4 is satisfied.

As a result, the first execution condition is satisfied and hence the driving support apparatus executes the deceleration assist control at the position P3.

With this configuration, the deceleration assist control is executed for the first time at a time point at which the own vehicle Vc has reached the position P3, and thus a timing at which the deceleration assist control is executed is delayed compared with the example of FIG. 5. As a result, there is a possibility that the own vehicle Vc cannot decelerate to the target vehicle speed or passengers on the own vehicle Vc feel uncomfortable due to a sudden deceleration.

Therefore, in the apparatus of the embodiment, the ECU 10 is configured to detect, based on the camera surrounding information, the road arrow marking on the adjacent lanes in addition to the road arrow marking on the traveling lane, and thereby also store in the RAM the adjacent lane arrow information in addition to the traveling lane arrow information. Besides, when it is determined that the first execution condition is not satisfied based on the traveling lane arrow information, the ECU 10 is configured to determine whether or not the first execution condition is satisfied based on the adjacent lane arrow information.

Specifically, the first execution condition is also satisfied when the following conditions 5 to 7 in addition to the aforementioned conditions 1 and 2 (precondition) are all satisfied.

(Condition 5) The conditions 3 or the condition 4 is not satisfied.
(Condition 6) The adjacent lane arrow information is stored in the RAM of the ECU 10.
(Condition 7) The permitted travel direction(s) of the adjacent lanes included in the adjacent lane arrow information include(s) the ON direction of the turn signal switch 15 and the permitted travel direction(s) does(do) not include the straight direction.

In a case in which the conditions 1 and 2 are satisfied, when the road arrow marking on the traveling lane has not been detected during a period from the time point at which the intersection was first detected to a current time point and thereby the traveling lane arrow information is not stored in the RAM, the ECU 10 determines that the condition 5 is satisfied due to unsatisfaction of the condition 3. A case in which the condition 5 is satisfied due to unsatisfaction of the condition 3 is, for example, a case in which the road arrow marking on the traveling lane is so faint that the camera sensor 11 cannot recognize it in addition to a case illustrated in FIG. 6A.

Further, in a case in which the conditions 1 to 3 are satisfied, when the permitted travel directions of the traveling lane included in the traveling lane arrow information do not include the turn signal ON direction, the ECU 10 determines that the condition 5 is satisfied due to unsatisfaction of the condition 4. The condition 4 becomes unsatisfied when, for example, the permitted travel direction included in the traveling lane arrow information is the "straight direction" and the right switch 15R is in the ON state.

In a case in which the conditions 1, 2, and 5 are satisfied, when the adjacent lane arrow information corresponding to the turn signal ON direction is stored in the RAM, the ECU 10 determines that the condition 6 is satisfied. A "case in which the conditions 1, 2, 5, and 6 are satisfied" corresponds to an example of a "second case". The "adjacent lane arrow information corresponding to the turn signal ON direction" means that, for example, the adjacent lane arrow information includes at least the right-side adjacent lane arrow information when the turn signal ON direction is a right direction.

In a case when the conditions 1, 2, 5, and 6 are satisfied (the second case), when the permitted travel direction of the adjacent lane included in the adjacent lane arrow information matches the turn signal ON direction, the ECU 10 determines that the condition 7 is satisfied. "the permitted travel direction of the adjacent lane matches the turn signal ON direction" means that the permitted travel direction of the adjacent lane is either the right-turn direction or the left-turn direction (that is, the permitted travel direction does not include the straight direction) and is the same as the turn signal ON direction. That is, the condition 7 may be satisfied when the adjacent lane is the right-turn-only lane or the left-turn-only lane. The condition 7 corresponds to an example of a "second direction condition".

Figure 7A:
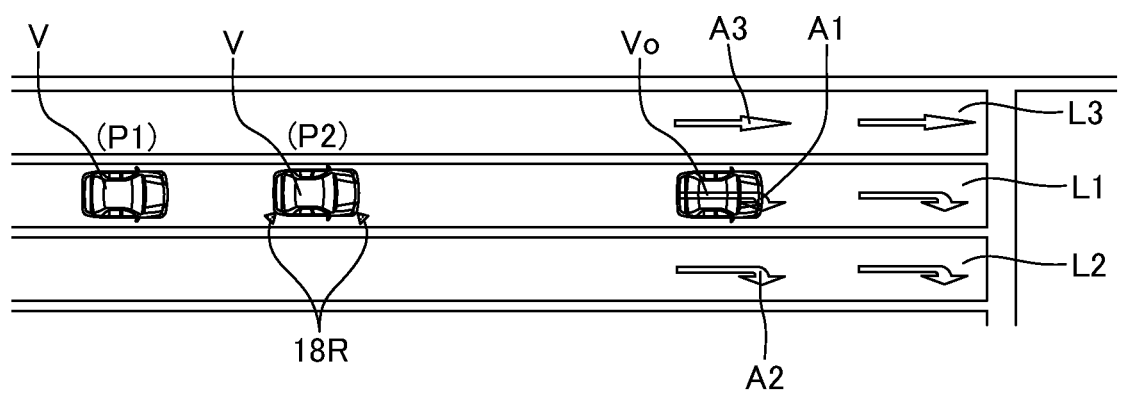
FIG. 7A is a diagram for illustrating a situation in which it is determined that the first execution condition is satisfied based on adjacent lane arrow information.
Figure 7B:
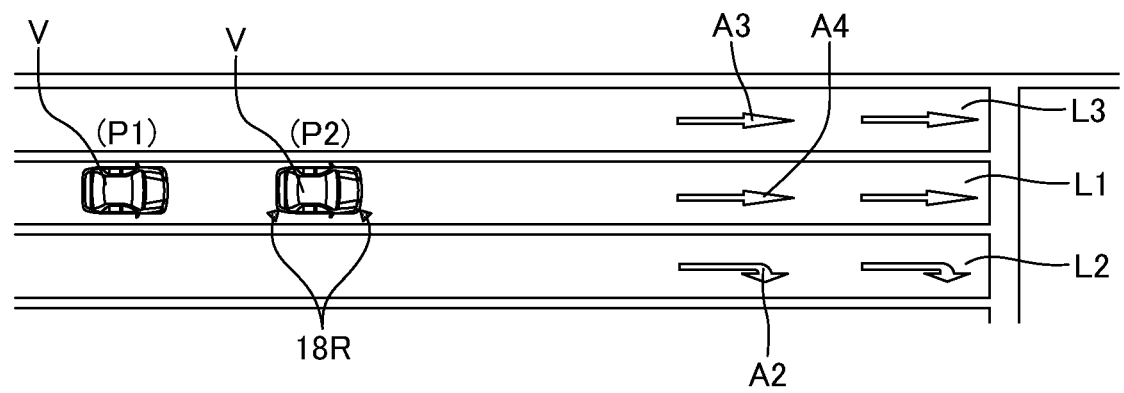
FIG. 7B is a diagram for illustrating another situation in which it is determined that the first execution condition is satisfied based on the adjacent lane arrow information.

A specific description is now given with reference to FIG. 7A and FIG. 7B. FIG. 7A and FIG. 7B are diagrams for both illustrating changes over time in the behaviors of the own vehicle V. The own vehicle V is going to turn right at an intersection (not shown) present in the front area after changing a lane to the right-side adjacent lane. FIG. 7A illustrates the same situation as FIG. 6A, and FIG. 7B illustrates the same situation as FIG. 6B. Therefore, in the examples of both FIG. 7A and FIG. 7B, the condition 1 is satisfied at the position P1 and the condition 2 is satisfied at the position P2.

In the example of FIG. 7A, the condition 3 is not satisfied even though the conditions 1 and 2 are satisfied at the position P2, and thus the condition 5 is satisfied.

On the other hand, in the example of FIG. 7B, the condition 4 is not satisfied even though the conditions 1 to 3 are satisfied at the position P2, and hence the condition 5 is satisfied.

In the examples of FIG. 7A and FIG. 7B, the ECU 10 detects the road arrow marking A2 on the adjacent lane L2 and stores(overwrites) the adjacent lane arrow information relating to this arrow marking A2 in association with the intersection during a period from the time point at which the intersection was first detected to a time point at which the own vehicle V reaches the position P2. Hence, the condition 6 is satisfied. Moreover, the adjacent lane L2 is the right-turn-only lane and thus, at the position P2, the permitted travel direction (the right-turn direction) of the adjacent lane L2 included in the adjacent lane arrow information matches the turn signal ON direction. Therefore, the condition 7 is satisfied.

As a result, the first execution condition becomes satisfied and thus the ECU 10 executes the deceleration assist control at the position P2. With this configuration, even when it is determined that the first execution condition is not satisfied due to unsatisfaction of the condition 3 or 4 in spite of satisfaction of the conditions 1 and 2, as long as the conditions 5 to 7 are satisfied, it is determined that the first execution condition is satisfied. In other words, even in a case in which it is determined that the first execution condition is not satisfied based on the traveling lane arrow information, whether or not the first execution condition is satisfied is determined based on the adjacent lane arrow information. Therefore, it is possible to execute the deceleration assist control at the same timing as the example of FIG. 5. As a result, the own vehicle can properly decelerate to the target vehicle speed, and a situation in which the passengers feel uncomfortable due to a sudden deceleration becomes less likely to occur. Accordingly, the deceleration assist control can be executed at a proper timing.

It should be noted that in a case in which the conditions 1, 2, 5, and 6 are satisfied, when the condition 7 is not satisfied because "the permitted travel directions of the adjacent lane included in the adjacent lane arrow information include the turn signal ON direction and the permitted travel directions include the straight direction," the ECU 10 determines that although the first execution condition is not satisfied, the second execution condition is satisfied and executes the light deceleration assist control.

Figure 8A:
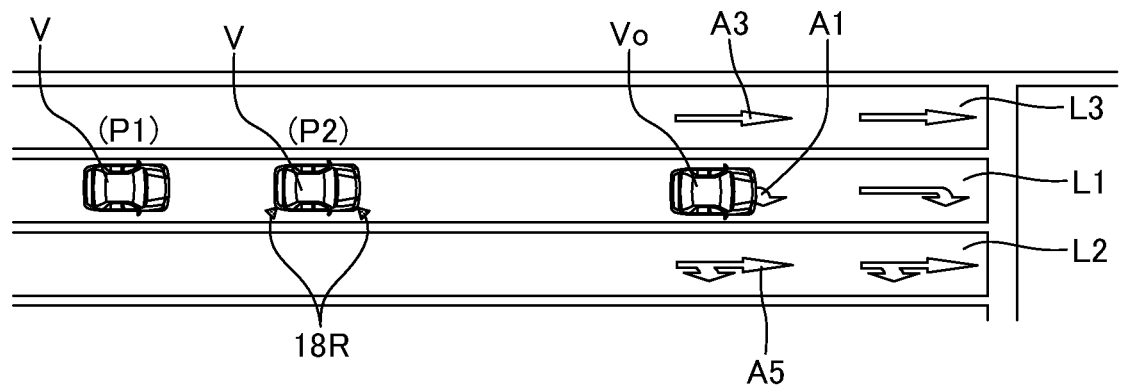
FIG. 8A is a diagram for illustrating a situation in which it is determined that a second execution condition is satisfied based on the adjacent lane arrow information.
Figure 8B:
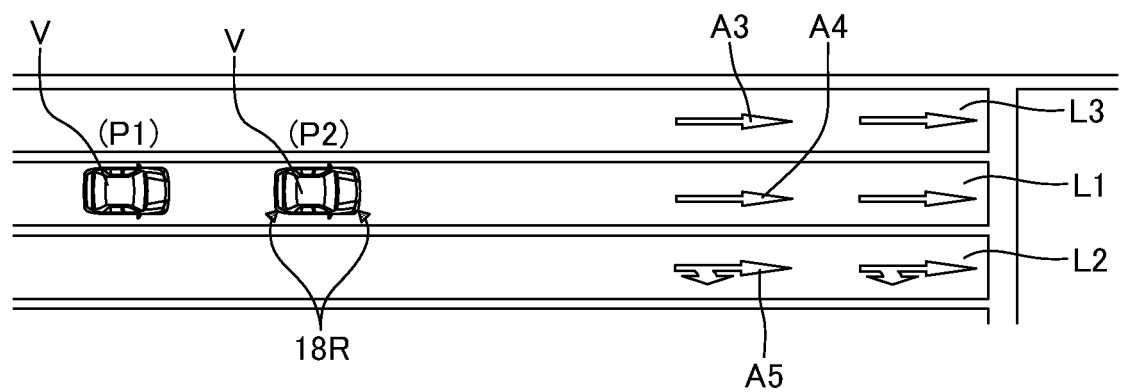
FIG. 8B is a diagram for illustrating another situation in which it is determined that the second execution condition is satisfied based on the adjacent lane arrow information.

A specific description is now given with reference to FIG. 8A and FIG. 8B. FIG. 8A and FIG. 8B are diagrams for both illustrating changes over time in the behaviors of the own vehicle V. FIG. 8A illustrates the same situation as FIG. 7A, and FIG. 8B illustrates the same situation as FIG. 7B. However, in FIG. 8A and FIG. 8B, a road arrow marking A5 (the same type as the road arrow marking A4 in FIG. 2) instead of the road arrow marking A2 is arranged on the right-side adjacent lane. Therefore, in both examples of FIG. 8A and FIG. 8B, the condition 1 is satisfied at the position P1 and the conditions 2, 5, and 6 are satisfied at the position P2. In the example of FIG. 8A, the condition 5 is satisfied due to unsatisfaction of the condition 3 and in the example of FIG. 8B, the condition 5 is satisfied due to unsatisfaction of the condition 4.

In both examples of FIG. 8A and FIG. 8B, the condition 7 is not satisfied because "the permitted travel directions (the straight direction and the right-turn direction) of the right-side adjacent lane included in the right-side adjacent lane arrow information include the turn signal ON direction and the permitted travel directions include the straight direction."

As a result, the second execution condition becomes satisfied and thus the ECU 10 executes the light deceleration assist control at the position P2. As shown in FIG. 8A and FIG. 8B, when the permitted travel directions indicated by the road arrow marking on the adjacent lane (strictly, the adjacent lane at a side of the turn signal ON direction) include not only the turn signal ON direction but also the straight direction, it is difficult to determine (judge) whether the own vehicle V is going to turn right or left at the intersection after the lane change or the own vehicle V is simply going only to change a lane to the adjacent lane. Thus, by the ECU 10 executing the light deceleration assist control instead of the deceleration assist control in such a case, it is possible to decelerate the own vehicle V to some extent before changing a lane when the own vehicle V is going to turn right or left at the intersection after the lane change, while it is possible to reduce a degree that the driver feels an unnecessary sense of deceleration when the own vehicle V is simply going only to change a lane to the adjacent lane.

On the other hand, in a case in which the conditions 1, 2, 5, and 6 are satisfied, when the condition 7 is not satisfied because "the permitted travel directions of the adjacent lane included in the adjacent lane arrow information does not include the turn signal ON direction," the ECU 10 determines that neither the first execution condition nor the second execution condition is satisfied and does not execute either the deceleration assist control or the light deceleration assist control.

A case in which "the permitted travel directions of the adjacent lane does not include the turn signal ON direction" is a case in which the permitted travel direction of the adjacent lane is the straight lane and the turn signal ON direction is the right direction or the left direction, for example. In such a case, it is highly likely that the turn signal lever WL is being operated in order only to the own vehicle V simply changing a lane to the adjacent lane. In other words, it is highly likely that the own vehicle V is not going to turn right or left at the intersection. Therefore, by the ECU 10 not executing either the deceleration assist control or the light deceleration assist control in such a case, it is possible to suppress the occurrence of an unrequired operation of the deceleration assist control.

In addition, when the condition 6 is not satisfied in a case in which the conditions 1, 2, and 5 are satisfied, the ECU 10 determines that the first execution condition is not satisfied and does not execute the deceleration assist control. As used herein, "when the condition 6 is not satisfied in a case in which the conditions 1, 2, and 5 are satisfied" includes the following two cases; one is a case in which the condition 5 is satisfied due to unsatisfaction of the condition 3 and the other is a case in which the condition 5 is satisfied due to unsatisfaction of the condition 4. In the former case, the ECU 10 determines that although the first execution condition is not satisfied, the second execution condition is satisfied and executes the light deceleration assist control, and in the latter case, the ECU 10 determines that neither the first execution condition nor the second execution condition is satisfied and does not execute either the deceleration assist control or the light deceleration assist control.

In the former case, the traveling lane arrow information is not stored in the RAM. On the other hand, in the latter case, the traveling lane arrow information is stored in the RAM and the permitted travel directions of the traveling lane included in this information do not include the turn signal ON direction. That is, in the latter case, on at least the traveling lane, a possibility that the own vehicle V is going to turn right or left at the intersection is extremely low. However, in the former case, the road arrow marking on the traveling lane becomes invisible (visually unrecognizable) only because of, for example, a presence of another vehicle or faintness, and thus, there is actually a possibility that the permitted travel directions of the traveling lane include the turn signal ON direction. In other words, there is a possibility that the own vehicle V is going to turn right or left at the intersection on the traveling lane.

Hence, by the ECU 10 executing the light deceleration assist control in the former case, it is possible to decelerate the own vehicle V to some extent when the own vehicle V is going to turn right or left at the intersection on the traveling lane, while it is possible to reduce the degree that the driver feels an unnecessary sense of deceleration when the own vehicle V is not going to do so (in other words, the own vehicle V is only going to change a lane).

Besides, by the ECU 10 not executing either the deceleration assist control or the light deceleration assist control in the latter case, it is possible to suppress the occurrence of unrequired operations of these controls.

The "former case" corresponds to an example of a "third case" and the "latter case" corresponds to an example of a "fourth case".

(Specific Operation)

Figure 10:
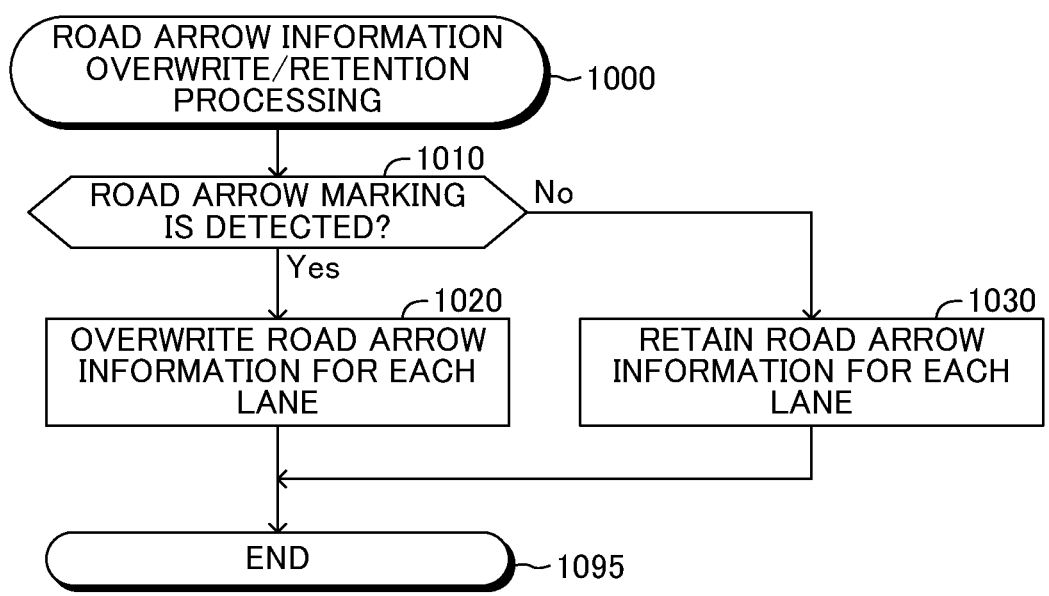
FIG. 10 is a flowchart for illustrating a routine to be executed by the CPU.

Next, specific operations of the ECU 10 are described. The CPU of the ECU 10 is configured to repeatedly execute, in parallel, the routine illustrated in the flowcharts of FIG. 9 and FIG. 10 and the routine illustrated in the flowchart of FIG. 11 every time a predetermined calculation period elapses while an ignition switch is in an on position.

At a predetermined timing, the CPU starts processing from Step 900 of FIG. 9, and the process advances to Step 905. Then, the CPU determines whether or not an intersection (in the embodiment, a traffic light) is detected based on the camera surrounding information and the radar surrounding information (condition 1 (a component of the precondition)).

When an intersection is not detected ("No" in Step 905), the process advances to Step 995, and the CPU temporarily ends this routine.

Meanwhile, when an intersection is detected ("Yes" in Step 905), the process advances to Step 910, and the CPU executes road arrow information overwrite/retention processing. This processing is described with reference to FIG. 10. When the process advances to Step 910, the CPU starts processing from Step 1000 of FIG. 10 and the process advances to Step 1010. Then, the CPU determines whether or not a road arrow marking is detected based on the camera surrounding information.

When a road arrow marking is detected ("Yes" in Step 1010), the process advances to Step 1020, and the CPU overwrites road arrow information stored in the RAM with road arrow information relating to the road arrow marking detected in Step 1010 for each lane. When no road arrow information is stored in the RAM, the CPU stores the road arrow information relating to the road arrow marking detected in Step 1010 in the RAM in association with the intersection for each lane (that is, overwriting processing is not executed).

Meanwhile, when a road arrow marking is not detected ("No" in Step 1010), the process advances to Step 1030, and the CPU retains road arrow information stored in the RAM. When no road arrow information is stored in the RAM, the CPU does not execute retention processing.

When the CPU finishes the processing of Step 1020 or Step 1030, the process advances to Step 915 of FIG. 9 via Step 1095. In Step 915, the CPU determines whether or not the turn signal switch 15 (right switch 15R or left switch 15L) is in the ON state based on the signal acquired from the turn signal switch 15 (condition 2 (a component of the precondition)).

When the turn signal switch 15 is in the OFF state ("No" in Step 915), the process advances to Step 995, and the CPU temporarily ends this routine.

Meanwhile, when the turn signal switch 15 is in the ON state ("Yes" in Step 915), the process advances to Step 920, and the CPU determines whether or not traveling lane arrow information is stored in the RAM based on a result of the road arrow information overwriting/retention processing (refer to FIG. 10) (condition 3).

When traveling lane arrow information is stored in the RAM ("Yes" in Step 920 (a first case)), the process advances to Step 925, and the CPU determines whether or not an ON direction of the turn signal switch 15 (turn signal ON direction) is included in permitted travel directions of traveling lane included in the traveling lane arrow information (condition 4 (a first direction condition)).

When the turn signal ON direction is included in the permitted travel directions ("Yes" in Step 925), the CPU determines that a first execution condition is satisfied (that is, the own vehicle is going to perform a right turn or a left turn). Subsequently, the process advances to Step 930 and the CPU executes deceleration assist control (refer to FIG. 5). Then, the process advances to Step 995, and the CPU temporarily ends this routine.

In contrast, when the traveling lane arrow information is not stored in the RAM ("No" in Step 920), the CPU determines that the condition 5 is satisfied, and the process advances to Step 935. In Step 935, the CPU determines whether or not adjacent lane arrow information is stored in the RAM (condition 6).

When adjacent lane arrow information is stored in the RAM ("Yes" in Step 935 (a second case)), the process advances to Step 945.

When the turn signal ON direction is not included in the permitted travel directions of the traveling lane ("No" in Step 925), the CPU determines that the condition 5 is satisfied, and the process advances to Step 940. In Step 940, the CPU determines whether or not adjacent lane arrow information is stored in the RAM (condition 6).

When adjacent lane arrow information is stored in the RAM ("Yes" in Step 940 (a second case)), the process advances to Step 945.

In Step 945, the CPU determines whether or not the turn signal ON direction is included in the permitted travel directions of adjacent lane included in the adjacent lane arrow information.

When a turn signal ON direction is included in the permitted travel directions of the adjacent lane ("Yes" in Step 945), the process advances to Step 950, and the CPU determines whether or not a straight direction is included in the permitted travel directions of the adjacent lane (condition 7 (a second direction condition)).

When a straight direction is not included in the permitted travel directions of the adjacent lane (in other words, when the permitted travel direction of the adjacent lane matches the turn signal ON direction) ("No" in Step 950), the CPU determines that the first execution condition is satisfied (that is, the own vehicle is going to turn right or left after the lane change), and executes the deceleration assist control in Step 930. Then, the process advances to Step 995, and the CPU temporarily ends this routine.

On the other hand, when a straight direction is included in the permitted travel directions of the adjacent lane ("Yes" in Step 950), the CPU determines that although the first execution condition is not satisfied, a second execution condition is satisfied (that is, it is difficult to determine (judge) whether the own vehicle is going to turn right or left after the lane change, or the own vehicle is only going to change a lane), and executes light deceleration assist control in Step 955. Then, the process advances to Step 995, and the CPU temporarily ends this routine.

When a turn signal ON direction is not included in the permitted travel directions of the adjacent lane ("No" in Step 945), the CPU determines that neither the first execution condition nor the second execution condition is satisfied (that is, the own vehicle is only going to change a lane), and temporarily ends this routine in Step 995. In this case, neither the deceleration assist control nor the light deceleration assist control is executed.

In contrast, when the traveling lane arrow information is not stored ("No" in Step 920) and the adjacent lane arrow information is not stored ("No" in Step 935 (a third case)) in the RAM, the CPU determines that although the first execution condition is not satisfied, the second execution condition is satisfied (that is, there is a possibility that the own vehicle is going to turn right or left on the traveling lane), and executes the light deceleration assist control in Step 960. Then, the process advances to Step 995, and the CPU temporarily ends this routine.

On the other hand, when a turn signal ON direction is not included in the permitted travel directions of the traveling lane ("No" in Step 925) and the adjacent lane arrow information is not stored in the RAM ("No" in Step 940 (a fourth case)), the CPU determines that neither the first execution condition nor the second execution condition is satisfied (that is, the own vehicle is not going to turn right or left at least on the traveling lane), and temporarily ends this routine in Step 995. In this case, neither the deceleration assist control nor the light deceleration assist control is executed.

Figure 11:
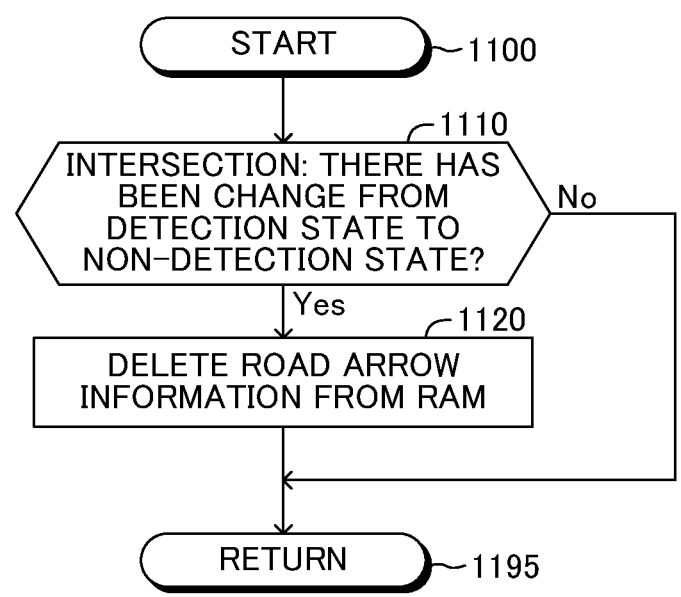
FIG. 11 is a flowchart for illustrating a routine to be executed by the CPU.

In parallel with this, the CPU starts processing from Step 1100 of FIG. 11. The process advances to Step 1110, and the CPU determines whether or not there has been a change from a state in which an intersection is detected (detection state) to a state in which an intersection is not detected (non-detection state) based on the camera surrounding information and the radar surrounding information.

When there has been a change from a detection state to a non-detection state ("Yes" in Step 1110), the CPU determines that the own vehicle V has passed through the intersection, the process advances to Step 1120, and the CPU deletes the road arrow information stored in the RAM. Then, the process advances to Step 1195, and the CPU temporarily ends this routine. Meanwhile, when a detection state is maintained or when an intersection was not detected in the first place ("No" in Step 1110), the process advances to Step 1195, and the CPU temporarily ends this routine.

As described above, in the apparatus of the embodiment, whether or not the first execution condition is satisfied is determined based not only on the traveling lane arrow information but also on the adjacent lane arrow information. Therefore, even in a case in which it is determined that the first execution condition is not satisfied based on the traveling lane arrow information, it is possible to determine whether or not the first execution condition is satisfied based on the adjacent lane arrow information. Accordingly, compared with a configuration in which a determination is made based only on the traveling lane arrow information, a situation in which a timing at which whether or not the first execution condition is satisfied is determined is delayed is less likely to occur. As a result, the driving support control can be executed at an appropriate timing.

The driving support apparatus, the driving support method, and the non-transitory computer-readable storage medium according to the embodiment has been described above. However, the present invention is not limited to the embodiments described above, and various variations can be made as long as such variations do not depart from the object of the present invention.

For example, in the embodiment, in a case in which the conditions 1, 2, 5, and 6 are satisfied, when the permitted travel directions of the adjacent lanes included in the adjacent lane arrow information include the turn signal ON direction and the permitted travel directions include a straight direction, resulting in the condition 7 being not satisfied, the ECU 10 determines that the second execution condition is satisfied to execute the light deceleration assist control. However, a configuration is not limited thereto. For example, in such a case, the ECU 10 may be configured to determine that the second execution condition is not satisfied and not to execute the light deceleration assist control.

In addition, the driving support apparatus may include a pre-right/left-turn deceleration assist switch. This switch enables the driver to select whether or not the driver wishes to execute the pre-right/left-turn deceleration assist control when an execution condition thereof is satisfied, and can be operated by the driver. The deceleration assist control may be executed when the execution condition thereof is satisfied in a case in which this switch is in the ON state.

Moreover, the execution condition of the deceleration assist control may include any one of the following conditions, that is, a condition that "both of the accelerator pedal and the brake pedal are not being operated," a condition that "the accelerator pedal is not being operated," or a condition that "the brake pedal is not being operated". Alternatively, the execution condition of the deceleration assist control may include a condition that "an acceleration operation or a deceleration operation by the driver is not being performed." This condition can be applied to, for example, a driving support apparatus mounted on a one-pedal type vehicle. As used herein, a one-pedal type vehicle is a vehicle in which an acceleration operation and a deceleration operation can be performed by using a single pedal. Typically, a one-pedal type vehicle accelerates when the pedal is depressed and decelerates when the pedal is released.

Further, when the first execution condition is satisfied, pre-right/left-turn warning control may be executed instead of, or in addition to, the pre-right/left-turn deceleration assist control. The pre-right/left-turn warning control is control of warning the driver of the vehicle such that the driver is prompted to decelerate the own vehicle before the own vehicle performs a right or left turn at an intersection. The warning may be performed by causing a speaker to emit speech, or by causing a buzzer to emit a sound and vibrate.

In addition, when the second execution condition is satisfied, pre-right/left-turn light warning control may be executed instead of, or in addition to, the pre-right/left-turn deceleration assist control. The pre-right/left-turn light warning control is control, a degree thereof of warning the driver being lightened compared with the pre-right/left-turn warning control. As used herein, "lightening a degree of warning" means decreasing sound volume of the speaker or reducing a degree of vibration of the buzzer.

The camera sensor 11 may be configured to recognize a pedestrian crossing instead of, or in addition to, recognizing the traffic light based on image data, and to calculate a relative relationship between the own vehicle and the pedestrian crossing. The ECU 10 may detect an intersection based on this relative relationship. Alternatively, the camera sensor 11 may be configured to recognize a median strip instead of, or in addition to, recognizing the traffic light based on image data, and to calculate a relative relationship between the own vehicle and the median strip. The ECU 10 may detect, based on the relative relationship, a point at which the median strip is not arranged as an intersection. In addition, the ECU 10 may detect the median strip based on the camera surrounding information and the radar surrounding information.

In addition, the apparatus of the embodiment can also be mounted on an own vehicle to be used in a country in which right-hand traffic is stipulated. Moreover, the present invention can also be applied to a vehicle traveling by autonomous driving (by autonomous driving control).

What is claimed is:

1. A driving support apparatus, comprising:
a surrounding information acquisition device configured to acquire information relating to a road marking and an intersection present in a front area, which is an area including a road surface in front of a vehicle, as surrounding information;
a steering information acquisition device configured to acquire information including whether or not steering operation is being performed by a driver of the vehicle as steering information; and
a control unit including a storage device, the control unit being configured to:
store, in a case in which an intersection is detected based on the surrounding information, when a road arrow marking is detected on a traveling lane which is a lane on which the vehicle is traveling or on an adjacent lane which is a lane adjacent to the traveling lane, road arrow information which is information including the road arrow marking and permitted travel directions of a lane indicated by the road arrow marking, in the storage device in association with the detected intersection for each lane;
execute, when a predetermined first execution condition including an intersection being detected based on the surrounding information is satisfied, driving support control including at least one of pre-right/left-turn deceleration assist control of automatically applying a braking force to the vehicle so that a deceleration of the vehicle matches a target deceleration and thereby assisting in deceleration of the vehicle to a predetermined target vehicle speed before the vehicle performs one of a right turn or a left turn at the detected intersection, or pre-right/left-turn warning control of warning the driver and thereby prompting the driver to perform a deceleration operation before the vehicle performs one of a right turn or a left turn at the detected intersection; and
determine, when a precondition is satisfied, the precondition being satisfied in a case in which it is determined that an intersection is detected based on the surrounding information and that steering operation is being performed by the driver based on the steering information, whether or not the first execution condition is satisfied based on the steering operation being performed and traveling lane arrow information which is the road arrow information of the traveling lane or adjacent lane arrow information which is the road arrow information of the adjacent lane, each of the traveling lane arrow information and the adjacent lane arrow information being stored in the storage device.

2. The driving support apparatus according to claim 1, wherein the control unit is configured to:
determine, in a first case in which the precondition is satisfied and the traveling lane arrow information is stored in the storage device, that the first execution condition is satisfied when a first direction condition is satisfied, the first direction condition being satisfied in a case in which a direction corresponding to the steering operation being performed is included in permitted travel directions of the traveling lane indicated by the traveling lane arrow information;
determine, in a second case in which the precondition is satisfied, either the traveling lane arrow information is not stored in the storage device or the first direction condition is not satisfied, and the adjacent lane arrow information is stored in the storage device, that the first execution condition is satisfied when a second direction condition is satisfied, the second direction condition being satisfied when a direction corresponding to the steering operation being performed is included in permitted travel directions of the adjacent lane indicated by the adjacent lane arrow information and a straight direction is not included in the permitted travel directions; and
determine, in the second case, that the first execution condition is not satisfied when the second direction condition is not satisfied.

3. The driving support apparatus according to claim 2, wherein the control unit is configured to:
further execute, when a predetermined second execution condition including an intersection being detected based on the surrounding information is satisfied, light driving support control including at least one of pre-right/left-turn light deceleration assist control, a degree thereof at which the vehicle decelerates to the target vehicle speed being lightened compared with the pre-right/left-turn deceleration assist control, or pre-right/left-turn light warning control, a degree thereof of warning the driver being lightened compared with the pre-right/left-turn warning control; and determine, in the second case, that the second execution condition is satisfied when the second direction condition is not satisfied due to a direction corresponding to the steering operation being performed being included in permitted travel directions of the adjacent lane indicated by the adjacent lane arrow information and a straight direction being included in the permitted travel directions.

4. The driving support apparatus according to claim 2, wherein the control unit is configured to:

further execute, when a predetermined second execution condition including an intersection being detected based on the surrounding information is satisfied, light driving support control including at least one of pre-right/left-turn light deceleration assist control, a degree thereof at which the vehicle decelerates to the target vehicle speed being lightened compared with the pre-right/left-turn deceleration assist control, or pre-right/left-turn light warning control, a degree thereof of warning the driver being lightened compared with the pre-right/left-turn warning control; and determine, in a third case in which the precondition is satisfied, and neither the traveling lane arrow information nor the adjacent lane arrow information is stored in the storage device, that the second execution condition is satisfied.

5. The driving support apparatus according to claim 4, wherein the control unit is configured to:

determine, in a fourth case in which the precondition is satisfied, the first direction condition is not satisfied, and the adjacent lane arrow information is not stored in the storage device, that neither the first execution condition nor the second execution condition is satisfied.

6. The driving support apparatus according to claim 1, wherein the steering information acquisition device is a direction indicator switch configured to detect an operation state of an operation device to be operated by the driver in order to operate a direction indicator, and is configured to acquire, as the steering information, whether or not the operation device is under a state of being operated by the driver.

7. A driving support method, comprising:

causing a surrounding information acquisition device to acquire information relating to a road marking and an intersection present in a front area, which is an area including a road surface in front of a vehicle, as surrounding information;

causing a steering information acquisition device to acquire information including whether or not steering operation is being performed by a driver of the vehicle as steering information;

storing, in a case in which an intersection is detected based on the surrounding information, when a road arrow marking is detected on a traveling lane which is a lane on which the vehicle is traveling or on an adjacent lane which is a lane adjacent to the traveling lane, road arrow information which is information including the road arrow marking and permitted travel directions of a lane indicated by the road arrow marking, in a storage device in association with the detected intersection for each lane;

executing, when a predetermined first execution condition including an intersection being detected based on the surrounding information is satisfied, driving support control including at least one of pre-right/left-turn deceleration assist control of automatically applying a braking force to the vehicle so that a deceleration of the vehicle matches a target deceleration and thereby assisting in deceleration of the vehicle to a predetermined target vehicle speed before the vehicle performs one of a right turn or a left turn at the detected intersection, or pre-right/left-turn warning control of warning the driver and thereby prompting the driver to perform a deceleration operation before the vehicle performs one of a right turn or a left turn at the detected intersection; and determining, when a precondition is satisfied, the precondition being satisfied in a case in which it is determined that an intersection is detected based on the surrounding information and that steering operation is being performed by the driver based on the steering information, whether or not the first execution condition is satisfied based on the steering operation being performed and traveling lane arrow information which is the road arrow information of the traveling lane or adjacent lane arrow information which is the road arrow information of the adjacent lane, each of the traveling lane arrow information and the adjacent lane arrow information being stored in the storage device.

8. A non-transitory computer-readable storage medium storing a driving support program for causing a computer to execute processing comprising:

causing a surrounding information acquisition device to acquire information relating to a road marking and an intersection present in a front area, which is an area including a road surface in front of a vehicle, as surrounding information;

causing a steering information acquisition device to acquire information including whether or not steering operation is being performed by a driver of the vehicle as steering information;

storing, in a case in which an intersection is detected based on the surrounding information, when a road arrow marking is detected on a traveling lane which is a lane on which the vehicle is traveling or on an adjacent lane which is a lane adjacent to the traveling lane, road arrow information which is information including the road arrow marking and permitted travel directions of a lane indicated by the road arrow marking, in a storage device in association with the detected intersection for each lane;

executing, when a predetermined first execution condition including an intersection being detected based on the surrounding information is satisfied, driving support control including at least one of pre-right/left-turn deceleration assist control of automatically applying a braking force to the vehicle so that a deceleration of the vehicle matches a target deceleration and thereby assisting in deceleration of the vehicle to a predetermined target vehicle speed before the vehicle performs one of a right turn or a left turn at the detected intersection, or pre-right/left-turn warning control of warning the driver and thereby prompting the driver to perform a deceleration operation before the vehicle performs one of a right turn or a left turn at the detected intersection; and determining, when a precondition is satisfied, the precondition being satisfied in a case in which it is determined that an intersection is detected based on the surrounding information and that steering operation is being performed by the driver based on the steering information, whether or not the first execution condition is satisfied based on the steering operation being performed and traveling lane arrow information which is the road arrow information of the traveling lane or adjacent lane arrow information which is the road arrow information of the adjacent lane, each of the traveling lane arrow information and the adjacent lane arrow information being stored in the storage device.

* * * * *